(12) United States Patent
Lopez et al.

(10) Patent No.: US 9,656,560 B2
(45) Date of Patent: May 23, 2017

(54) CHARGE CYCLE STRATEGY FOR VEHICLES USING SMALLER CROSS SECTION CABLE

(71) Applicant: Ford Global Technologies, LLC, Dearborn, MI (US)

(72) Inventors: Juan Lopez, Madison Heights, MI (US); Nondo G. Basoukeas, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 14/570,147

(22) Filed: Dec. 15, 2014

(65) Prior Publication Data
US 2016/0167535 A1    Jun. 16, 2016

(51) Int. Cl.
*H02J 7/00* (2006.01)
*B60L 11/18* (2006.01)

(52) U.S. Cl.
CPC ....... *B60L 11/1816* (2013.01); *B60L 11/1805* (2013.01); *B60L 11/187* (2013.01); *B60L 11/1861* (2013.01); *Y02T 10/7005* (2013.01)

(58) Field of Classification Search
CPC .................................................. Y02T 90/14
USPC ....................................................... 320/109
See application file for complete search history.

(56) References Cited

U.S. PATENT DOCUMENTS

| | | |
|---|---|---|
| 5,408,209 A | 4/1995 | Tanzer et al. |
| 5,412,304 A | 5/1995 | Abbott |
| 5,548,200 A | 8/1996 | Nor et al. |
| 5,594,315 A | 1/1997 | Ramos et al. |
| 5,670,860 A | 9/1997 | Conrady et al. |
| 5,684,380 A | 11/1997 | Woody et al. |
| 5,909,099 A | 6/1999 | Watanabe et al. |
| 6,175,212 B1 | 1/2001 | Oguri |
| 6,396,241 B1 | 5/2002 | Ramos et al. |
| 8,098,044 B2 | 1/2012 | Taguchi |
| 8,118,147 B2 | 2/2012 | Ori et al. |
| 8,174,235 B2 | 5/2012 | Dyer et al. |
| 8,350,526 B2 | 1/2013 | Dyer et al. |
| 8,723,477 B2 | 5/2014 | Gaul et al. |
| 8,965,716 B2 | 2/2015 | Ley et al. |
| 9,287,646 B2 | 3/2016 | Mark |
| 9,321,362 B2 | 4/2016 | Woo et al. |
| 9,451,723 B2 | 9/2016 | Lofy et al. |
| 2010/0156355 A1 | 6/2010 | Bauerle et al. |
| 2011/0204849 A1* | 8/2011 | Mukai ............... B60L 3/0069 320/111 |

(Continued)

FOREIGN PATENT DOCUMENTS

JP     2012256480 A   * 12/2012

*Primary Examiner* — Suresh Memula
(74) *Attorney, Agent, or Firm* — David Kelley; Brooks Kushman P.C.

(57) ABSTRACT

A vehicle includes a traction battery that is coupled to an external charger via a charge port. The traction battery has a maximum charge current. At least one conducting element between the charger and the traction battery is configured with a continuous current rating that is less than the maximum charge current. A controller within a vehicle charging system is programmed to control the current flow through the conducting element such that a current greater than the continuous current rating is conducted for less than a predetermined time that is based on an expected temperature rise of the conducting element.

20 Claims, 4 Drawing Sheets

(56) References Cited

U.S. PATENT DOCUMENTS

| | | |
|---|---|---|
| 2013/0335024 A1* | 12/2013 | Akai ..................... H01M 10/44 |
| | | 320/109 |
| 2014/0042968 A1* | 2/2014 | Hiroe .................. H01M 10/443 |
| | | 320/109 |
| 2014/0081490 A1 | 3/2014 | Adelman |
| 2014/0179164 A1 | 6/2014 | Kanamori et al. |
| 2014/0217978 A1 | 8/2014 | Gellert |
| 2014/0266038 A1 | 9/2014 | Gilbeau et al. |
| 2015/0054460 A1 | 2/2015 | Epstein et al. |
| 2016/0107530 A1* | 4/2016 | Roberts ............... B60L 11/1818 |
| | | 320/109 |

* cited by examiner

CHARGE CYCLE STRATEGY FOR VEHICLES USING SMALLER CROSS SECTION CABLE

TECHNICAL FIELD

This application generally relates to charging vehicle batteries.

BACKGROUND

Electric and plug-in hybrid vehicles include a traction battery to provide power for propulsion and accessory loads. To function effectively, the traction battery must be charged when a state of charge of the battery falls below a threshold. A charger that is connected to an external power source may be coupled to the vehicle for the purpose of charging the traction battery. The charger may connect to a charge port of the vehicle. The charger may provide a maximum battery charging current to the traction battery during charging. Conducting elements within the vehicle are designed to conduct the maximum battery charging current for an indefinite period of time without a temperature of the conducting elements rising above a predetermined temperature.

SUMMARY

A vehicle charging system includes a conducting element configured to couple a charger to a traction battery and having a continuous current rating less than a maximum charge current. The vehicle charging system also includes a controller programmed to control current flow through the conducting element such that a current greater than the continuous current rating is conducted for less than a predetermined time that is based on an expected temperature rise of the conducting element caused by the current. The conducting element may be a conductor having a predetermined cross sectional area. The conducting element may be a connecter pin or a connector terminal. The conducting element may includes a welded termination or a crimped termination. The predetermined time may decrease as the current increases. The predetermined time may be selected to limit a temperature rise of the conducting element to less than a predetermined temperature rise relative to an ambient temperature. The predetermined time may be further based on a cross sectional area of the conducting element. The controller may be further programmed to decrease the current after the predetermined time. The current and the predetermined time may be selected from a charging current profile. The charging current profile may include a plurality of charging currents and associated time values that are configured to limit a temperature of the conducting element to less than a predetermined temperature.

A vehicle includes a traction battery, a conducting element configured to couple a charge port to the traction battery and having a continuous current rating less than a maximum charge current, and a controller. The controller is programmed to control current flow through the conducting element such that a current greater than the continuous current rating is conducted for less than a predetermined time that is based on an expected temperature rise of the conducting element. The conducting element may be a conductor having a predetermined cross sectional area. The conducting element may be a connecter pin or a connector terminal. The predetermined time may decrease as the current increases. The predetermined time may be selected to limit a temperature rise of the conducting element to less than a predetermined temperature rise relative to an ambient temperature. The predetermined time may be further based on a cross sectional area of the conducting element. The controller may be further programmed to decrease the current after the predetermined time.

A method includes coupling a traction battery to an external power source with a conductive element having a continuous current rating that is less than a maximum charge current of the traction battery. The method further includes controlling, by a controller, current flow through the conducting element such that a current greater than the continuous current rating is conducted for less than a predetermined time that is based on an expected temperature rise of the conducting element. The predetermined time may be selected to limit a temperature rise of the conducting element to less than a predetermined temperature rise relative to an ambient temperature. Controlling current flow may include decreasing the current after the predetermined time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
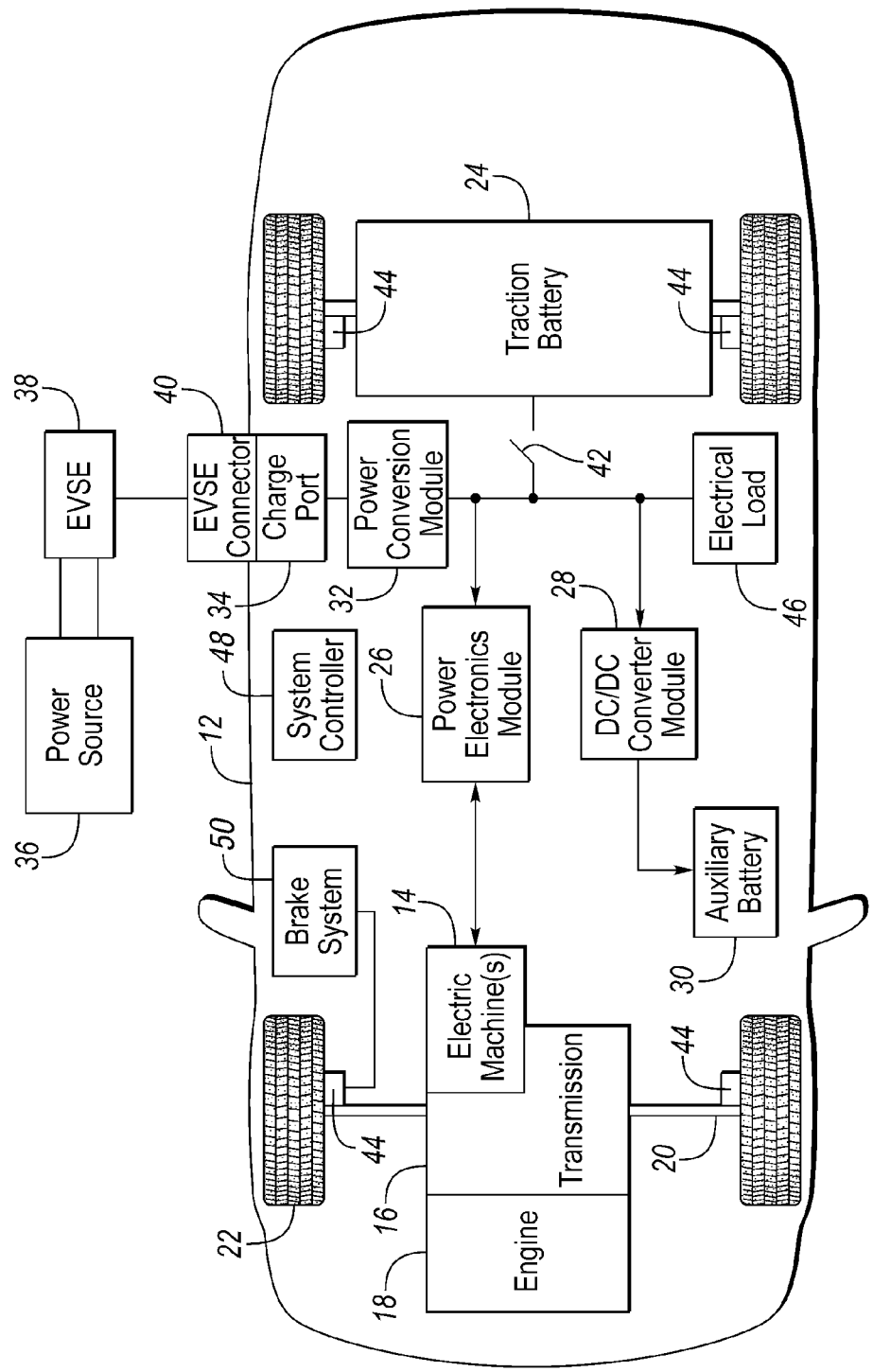
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have terminals with recesses that mate with corresponding pins of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. A system controller 48 may be present to coordinate the operation of the various components.

Figure 2:
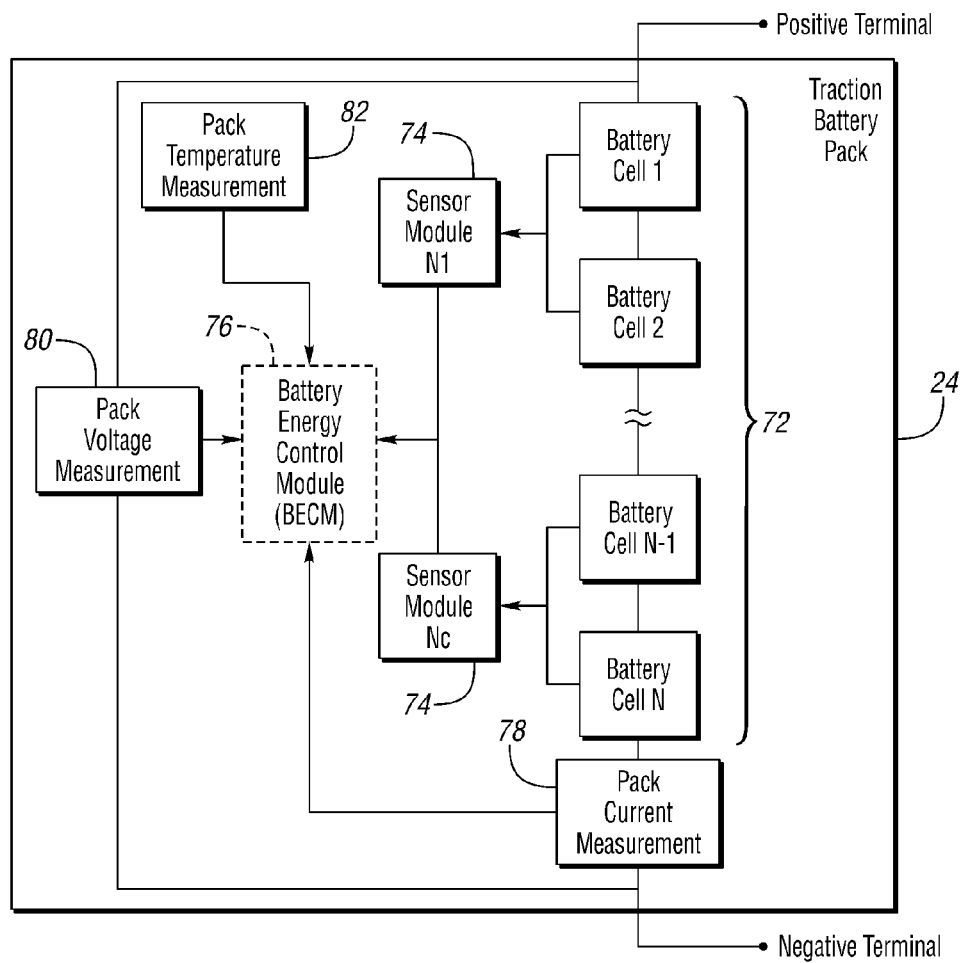
FIG. 2 is a diagram of an exemplary battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery management system may have a one or more controllers, such as a Battery Energy Control Module (BECM) 76 that monitors and controls the performance of the traction battery 24. The BECM 76 may monitor several battery pack level characteristics using various sensors and associate circuitry that may include a pack current sensor 78, a pack voltage sensor 80 and pack temperature sensor 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. The battery management system may use a sensor module 74 to measure the battery cell 72 characteristics. Depending on the capabilities, the sensor module 74 may include sensors and circuitry to measure the characteristics of one or multiple of the battery cells 72. The battery management system may utilize up to $N_c$ sensor modules or Battery Monitor Integrated Circuits (BMIC) 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

The BECM 76 may include circuitry to interface with the one or more contactors 42. The positive and negative terminals of the traction battery 24 may be protected by contactors 42.

Figure 3:
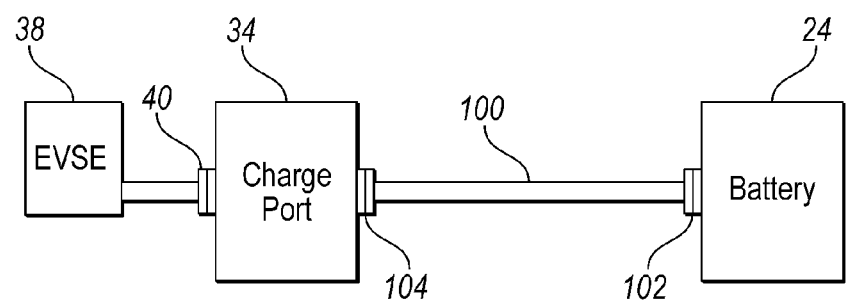
FIG. 3 is a diagram depicting an exemplary connection between a charge port and a traction battery.

FIG. 3 depicts a diagram of a possible conductor connection between the charge port 34 and the traction battery 24. A conductor 100 may couple the traction battery 24 to the charge port 34. The conductor 100 may route current to charge the traction battery 24. The conductor 100 may be a copper wire having a cross sectional area. A first connection system 102 may connect the conductor 100 to the traction battery 24. A second connection system 104 may connect the conductor 100 to the charge port 34. The first connection system 102 and the second connection system 104 may be configured differently. Additional conductors may be present. In addition, other components or modules may be connected between the charge port 34 and the battery 24.

The current carrying capability of the charging system is determined by parameters such as contact design (terminal/pin system), cable termination strategy (e.g., welding, crimping), and cable/conductor size. In general, as the current carrying capability of the system increases, the size and cost of the system increases as well.

Connections between and within components of the vehicle may be achieved using various conducting elements. The conducting elements may include conductors such as wires and bus bars. For example, a conductor may be a round copper wire having a cross sectional area. The conductors are typically designed to transfer current for long periods of time at current levels at or below a certified continuous current rating. That is, the conductor could operate indefinitely when the current flowing through the conductor is less than or equal to the continuous current rating value. In a vehicle charging system, this design choice may lead to conductors having a relatively large cross sectional area. It is well known that as the cross sectional area of the conductor increases, the current carrying capability of the conductor increases. A conductor in the charging system may be sized based on a maximum rated charging current for the traction battery.

Figure 4A:
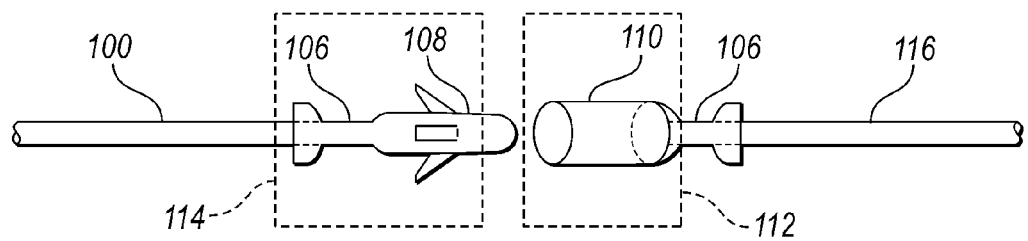
FIG. 4A is a diagram depicting an exemplary pin/terminal connection system using crimped connections.

FIG. 4A depicts an example of a connector with a pin 108 and a terminal 110 in which the conductors 100, 116 with a crimped termination 106 to the pin 108 and terminal 110. For example, the conductor 100 may be part of the charge port 34, while the conductor 116 may be a part of the EVSE 38. A conductor 100 may be coupled using a connection system that may include a pair of connectors. The connectors may be comprised of two housings 112, 114 that are configured to interconnect such that, when the housings 112, 114 are coupled together, corresponding conductive elements 108, 110 within each of the housings 112, 114 are in contact with one another. The conductive elements 108, 110 may be configured such that one of the housings 114 includes conductive pins 108 while the mating housing 112 may include conductive terminals 110 having a recess for receiving the pins 108. Typical connectors include terminals and pins designed to conduct a current at a continuous current rated value for an indefinite period of time. An additional consideration for connectors may be to ensure that the temperature of the connector remains below a predetermined temperature to prevent damage to the connector during operation.

Different methods of terminating a conductor at a pin or terminal are available. A conductor 100 may be terminated by crimping to another conducting element. For example, a pin or terminal 108, 110 may provide a recess at one end for receiving the conductor 100, 116. The conductor 100, 116 may be inserted into the recess and a force may be applied to that portion of the connector that surrounds the conductor to compress the pin or terminal around the conductor.

Figure 4B:
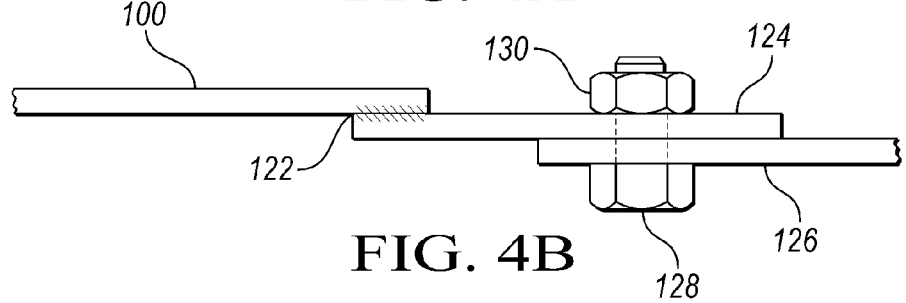
FIG. 4B is a diagram depicting an exemplary conductor connection system using a welded or soldered joint.

FIG. 4B depicts an example of a connector that includes a welded or soldered termination 122 to a terminal 124. The terminal 124 may be a conductive material defining a first opening. The terminal 124 may be placed in contact with a bus bar 126. The bus bar 126 may define a second opening, which may be aligned with the first opening. A fastener 128 may be inserted through the openings. A nut 130 or other means of securing the fastener 128 may be used. When the nut 130 is tightened, the terminal 124 and the bus bar 126 may be in contact such that a current may flow from the conductor 100 to the bus bar 126. The connection between the conductor 100 and the terminal 124 may be a welded and soldered joint 122.

Various combinations of the elements of FIGS. 4A and 4B may be applied. Crimped terminations 106 and welded terminations 122 may be used interchangeably in the various configurations. The charging system described herein applies to connections within the charge port 34 and the traction battery 24 as well as to connections between the two. Note that FIGS. 4A and 4B depict examples of connection systems and the system described is not limited to these examples depicted.

The traction battery 24 may be charged with a maximum battery charge current. The maximum battery charge current may be the maximum current that may be accepted by the traction battery 24 for charging. The traction battery 24 is not necessarily charged at the maximum battery charge current for an entire charge cycle. The conducting elements in the vehicle 12, however, are typically designed as if charging will be done continuously at the maximum battery charge current. A typical vehicle application may design the conducting elements between the charger 38 and the traction battery 24 such that the continuous current rating is at least equal to the maximum battery charge current.

The continuous current rating for a conducting element is the amount of current that the conducting element can carry continuously without exceeding a temperature that may damage the conducting element. The continuous current rating of a conductor may be affected by a cross sectional area of the conductor. For example, for a wire, the continuous current rating increases as the cross sectional area of the wire increases. For connections between pins and terminals other factors, such as surface contact area, may affect the continuous current rating. The continuous current rating may be a maximum current that the conducting element can conduct for an unlimited period of time without a temperature of the conducting element becoming greater than a predetermined temperature at which the conducting element overheats.

To reduce cost and size in a vehicle application, conducting elements having a continuous current rating that is less than the maximum battery charge current may be utilized. For example, wires may be utilized that have a reduced cross sectional area such that the maximum battery charge current cannot be conducted indefinitely. However, the maximum battery charge current may be carried by the conducting element having a smaller cross sectional area for a finite period of time instead of continuously. A charging current profile may be constructed to limit the amount of time at the maximum battery charge current based on the cross sectional area of the conductor.

The charging current profile may be a current versus time profile. As the continuous current rating of the conducting element is decreased, the amount of time conducting the maximum battery charge current may be reduced. The charging current profile may be configured to prevent the temperature of the conducting element from increasing to greater than a predetermined temperature that may damage the conducting element by overheating.

Advantages of using conducting elements with a smaller cross sectional area includes lower cost and improved packaging of the conducting elements. Overall cost may be reduced as conductors and connectors may only be required to satisfy the lower continuous current ratings. The effect on charging performance may be minimal as the traction battery 24 may not typically draw the maximum battery charge current continuously during a charge cycle.

A battery management system may be configured to limit a temperature rise of the conducting elements to meet automotive standards. A control strategy may be implemented in a vehicle 12 utilizing undersized conducting elements to limit the rate of temperature increase and maximum temperature of the conducting elements. The control strategy may be designed to ensure that the conducting element having the lowest continuous current rating does not experience a temperature greater than a predetermined temperature. The current flowing through the conducting elements may be controlled to ensure that the temperature limits of the conducting elements are not exceeded.

The temperature may be constrained to rise no more than a predetermined temperature above an ambient temperature to meet industry standards. For example, current industry standards allow a rise of up to 50 degrees Celsius above ambient temperature. Standards may change in the future. The current profile for charging the traction battery may be configured to limit the temperature of the conducting elements to less than a predetermined temperature.

The controller, such as the BECM 76, may be programmed to implement the charging current profile. The controller 76 may communicate with the EVSE 38 to control the amount of current that flows from the external power source 36 to the traction battery 24. The controller 76 may measure and monitor the actual current flowing through the traction battery 24. The actual or requested current may be used in conjunction with the current profile. In addition, temperature sensors 82 may be present to measure the temperature of the traction battery 24 and conducting elements. The controller 76 may utilize the measured temperatures to limit the current to avoid excessive temperatures.

Figure 5:
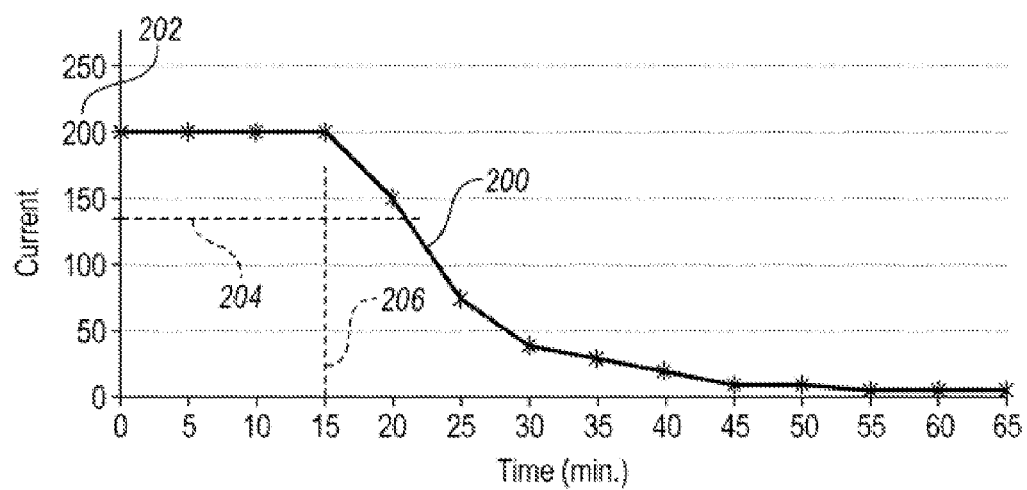
FIG. 5 is a graph depicting an exemplary charging current profile.

FIG. 5 depicts a possible current profile for charging the traction battery. The current profile may be a current versus time curve 200. A maximum battery charging current 202 may be conducted for a limited time period 206. After the limited time period 206, the current may be decreased. The continuous current rating 204 may be less than the maximum battery charging current 202. Over time, the current may be decreased to less than the continuous current rating 204. The current profile may be derived from experimental data.

As an example, a traction battery having a maximum battery charge current of 200 Amps may be designed to handle the full current continuously. A conductor size of 50 mm$^2$ would enable the charging system to continuously flow 200 Amps. However, a current of 200 Amps may be carried by a conductor with a cross sectional area of 35 mm$^2$ for approximately 30 minutes before a temperature rise of 50 degrees Celsius from an ambient temperature. A controller may be implemented to allow the maximum battery charge current of 200 Amps for less than 30 minutes. The current may be decreased after this time. In practice, the controller may decrease the current after a time less than 30 minutes (e.g., 20 minutes) to allow for some margin and component variations.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charging system comprising:
   a conducting element configured to couple a charger to a traction battery and having a continuous current rating less than a maximum charge current; and
   a controller programmed to control current flow through the conducting element such that a current greater than the continuous current rating is conducted for less than a predetermined time that is based on an expected temperature rise of the conducting element caused by the current.

2. The vehicle charging system of claim 1 wherein the conducting element is a conductor having a predetermined cross sectional area.

3. The vehicle charging system of claim 1 wherein the conducting element is a connecter pin or a connector terminal.

4. The vehicle charging system of claim 1 wherein the conducting element includes a welded termination or a crimped termination.

5. The vehicle charging system of claim 1 wherein the predetermined time decreases as the current increases.

6. The vehicle charging system of claim 1 wherein the predetermined time is selected to limit a temperature rise of the conducting element to less than a predetermined temperature rise relative to an ambient temperature.

7. The vehicle charging system of claim 1 wherein the predetermined time is further based on a cross sectional area of the conducting element.

8. The vehicle charging system of claim 1 wherein the controller is further programmed to decrease the current after the predetermined time.

9. The vehicle charging system of claim 1 wherein the current and the predetermined time are selected from a charging current profile.

10. The vehicle charging system of claim 9 wherein the charging current profile includes a plurality of charging currents and associated time values that are configured to limit a temperature of the conducting element to less than a predetermined temperature.

11. A vehicle comprising:
a traction battery;
a conducting element configured to couple a charge port to the traction battery and having a continuous current rating less than a maximum charge current; and
a controller programmed to control current flow through the conducting element such that a current greater than the continuous current rating is conducted for less than a predetermined time that is based on an expected temperature rise of the conducting element.

12. The vehicle of claim 11 wherein the conducting element is a conductor having a predetermined cross sectional area.

13. The vehicle of claim 11 wherein the conducting element is a connecter pin or a connector terminal.

14. The vehicle of claim 11 wherein the predetermined time decreases as the current increases.

15. The vehicle of claim 11 wherein the predetermined time is selected to limit a temperature rise of the conducting element to less than a predetermined temperature rise relative to an ambient temperature.

16. The vehicle of claim 11 wherein the predetermined time is further based on a cross sectional area of the conducting element.

17. The vehicle of claim 11 wherein the controller is further programmed to decrease the current after the predetermined time.

18. A method comprising:
coupling a traction battery to an external power source with a conductive element having a continuous current rating that is less than a maximum charge current of the traction battery; and
controlling, by a controller, current flow through the conducting element such that a current greater than the continuous current rating is conducted for less than a predetermined time that is based on an expected temperature rise of the conducting element.

19. The method of claim 18 wherein the predetermined time is selected to limit a temperature rise of the conducting element to less than a predetermined temperature rise relative to an ambient temperature.

20. The method of claim 18 wherein controlling current flow includes decreasing the current after the predetermined time.

* * * * *